United States Patent [19]

Watanabe et al.

[11] 3,803,591

[45] Apr. 9, 1974

[54] A-D CONVERSION SYSTEM USING MAGNETIC BUBBLES

[75] Inventors: Teruji Watanabe, Niza-shi; Hideo Ishihara, Kamakura-shi, both of Japan

[73] Assignee: Kokusai Denshin Denwa Kabushiki Kaisha, Chiyoda-ku, Tokyo-to, Japan

[22] Filed: Oct. 18, 1972

[21] Appl. No.: 298,570

[30] Foreign Application Priority Data

Oct. 18, 1971 Japan .............................. 46-82289
Feb. 21, 1972 Japan .............................. 47-17172

[52] U.S. Cl. .................... 340/347 AD, 340/174 TF
[51] Int. Cl. ......................................... H03k 13/02
[58] Field of Search..... 340/347 AD, 172.5, 174 TF

[56] References Cited

OTHER PUBLICATIONS

"IBM Technical Disclosure Bulletin" Chang et al. Vol. 14, No. 7, Dec. 1971, pg. 2,218–2,219.
"IBM Technical Disclosure Bulletin" Albert et al. Vol. 13, No. 12, May 1971, pg. 3,637.
Levi "IBM Technical Disclosure Bulletin" Vol. 14, No. 6, Nov. 1971, pg. 1,876.

*Primary Examiner*—Charles D. Miller
*Attorney, Agent, or Firm*—Robert E. Burns; Emmanuel J. Lobato

[57] ABSTRACT

An A-D conversion system, for converting an analog input signal to a digital signal, comprising an orthoferrite sheet on which are disposed circuits comprising a bubble generating section, a bubble selection section, an encoding section and a transmission section. The bubble generating section generates a number of magnetic bubbles in the orthoferrite sheet equal to the number of quantization levels corresponding to the maximum value of the analog input signal being converted. In the bubble generating section bubbles are transferred from bubble holding loops to bubble dividing loops where they are divided. Bias control loops transfer a number of the divided bubbles equal to the quantization level of the analog signal at a sampling time to the selection section. The selection section selects the bubble corresponding to the most significant digit of the value of the sampled analog signal and transmits the selected bubble to the encoding section. The encoding section comprises drive loops for encoding the sampled analog signal value, represented by the selected bubble, into a particular code. Bubbles representing the encoded value of the sampled signal are transferred to the transmission section where they are available for transmission to other circuits. The system can be provided with an output circuit for converting the output bubbles to a voltage proportional to the sampled value of the analog voltage, storage circuits for storing magnetic bubbles representative of the analog signals sampled value in the orthoferrite sheet, and delay circuits to delay the transfer of bubbles within the system or at the output by controllable increments of time.

3 Claims, 9 Drawing Figures

A-D CONVERSION SYSTEM USING MAGNETIC BUBBLES

This invention relates to an A-D conversion system for converting an analog signal into a digital signal by utiliging magnetic bubbles produced in a magnetic sheet of an orthoferrite having an easy magnetization axis oriented perpendicular to its surface.

In PCM communication systems, an analog signal, which is usually a continuous wave, is encoded and transmitted in the form of a digital signal. It is desirable in an A-D converter employed in this case that the ratio (S/N) of the quantizing noise attendant with the encoding to the amplitude of an input signal be made constant within the dynamic range of the input signal and that the number of bits of the digital signal transmitted be decreased. During encoding of the input analog signal, a low-level input signal is sampled at a high sampling frequency and a high-level input signal is sampled at a low sampling frequency, thereby maintaining a satisfactory signal to noise ratio at low levels. This method is referred to as a companding system or a non-linear encoding system.

Companding systems are roughly classified as follows:

1. An instantaneous companding system in which an input analog signal is compressed with a non-linear circuit formed with a diode or the like and then linearly encoded, or 2. a digital companding system in which an input analog signal is linearly encoded and then fed to a specific logical companding circuit for appropriately "thinning out" high-level signals.

Heretofore, various methods of realizing these systems have been proposed, but the instantaneous companding system suffers from mismatching unless non-linear circuits of the same characteristic are provided on both transmitting and receiving while and the digital companding system is free from mismatching between transmission and reception but is difficult to realize and physically large.

An object of this invention is to provide a small-sized high performance A-D converter which is capable of providing a desired compression characteristic by representing the level of the input analog signal by a plurality of magnetic bubbles.

The analog to digital converter of this invention employs a magnetic sheet of orthoferrite and operates by first representing the value of an input analog signal by a representative number of magnetic bubbles formed in the magnetic sheet, and then encoding the number of bubbles as a digital signal.

This invention will hereinafter be described in detail with reference to the accompanying drawings, in which:

FIGS. 2, 3, 4 and 5 are diagrams for explaining one concrete example of each of the sections of FIG. 1 and its operation.

FIG. 1 is a diagram illustrating the internal function of the A-D converter according to this invention, which comprises four sections:

1. a magnetic bubble generating section NG;
2. a magnetic bubble selecting section BC;
3. an encoding section CD; and
4. a high speed magnetic bubble transmitting section HP.

The functions of these sections are as follows:

1. The magnetic bubble generating section NG samples the level of the input analog signal applied to input means T*i* at regular time intervals and, as a first stage of quantizing the sampled levels of the analog signal, converts the sampled levels of the analog signal into a number of magnetic bubbles (e.g., Decimal (DL) 1,2,3..) equal to the value of the sampled level.

2. The magnetic bubble selecting section BC bubble corresponding to most significant digit of the sampled level of the analog signal represented by the vertically aligned magnetic bubbles derived from the input analog signal in the bubble generating section NG) and transmits the selected magnetic bubble at high speed to one encoder of encoding section corresponding to the position of the selected magnetic bubbles as the second stage of quantization.

3. The encoding section CD comprises a plurality of encoders that encode the magnetic bubbles transmitted from the magnetic bubble selecting section BC described above in (1), in a desired code.

4. The high speed magnetic bubble transmitting section HP transmits at high speed an encoded digital signal (in the form of a train of magnetic bubbles in this case derived from the output of the desired encoder to provide an output digital signal at the same output position. Each of these four sections are described in detail below.

Figure 1:
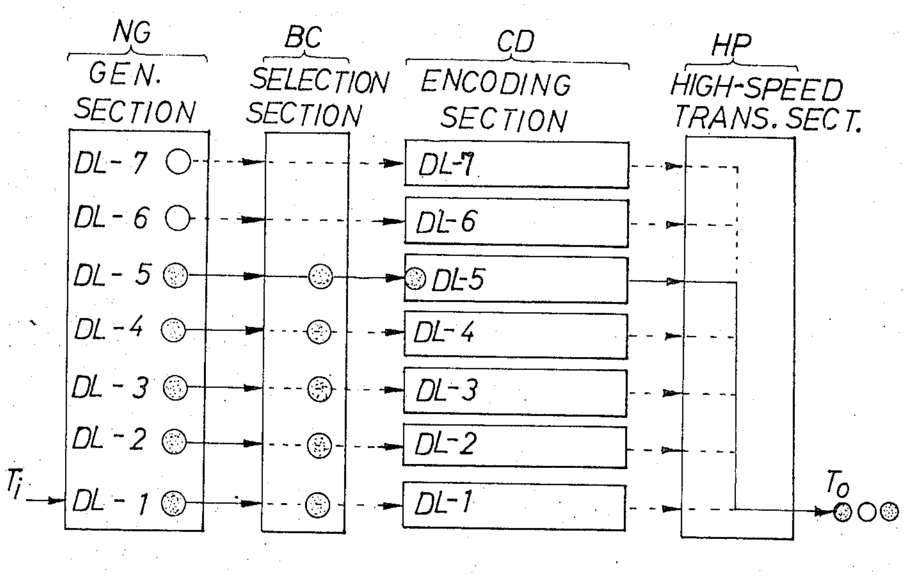
FIG. 1 is a diagram for explaining the outline of an A-D converter according to the system of this invention.
Figure 2A:
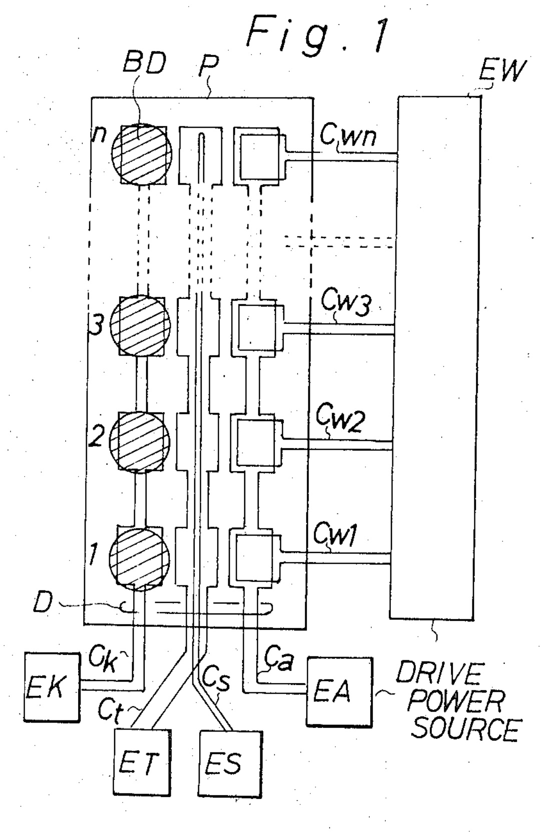

FIGS. 2A, 2B, 2C and 2D are provided for explaining the operation of a concrete example of the magnetic bubble generating section NG described previously in connection with FIG. 1 including: the sampling of the input analog signal, converting the input analog signal level into a number represented by a number of magnetic bubbles as the first step of quantization and a compressing operation. When a magnetic sheet of an orthoferrite formed with an easy magnetization axis perpendicular to its surface, is biased with an appropriate DC magnetic field in a direction perpendicular to the surface of the sheet, a magnetic bubble with a field in opposition (herein after referred to as a bubble) to the bias magnetic field is formed in the magnetic sheet. It is well-known that since this magnetic bubble can freely be generated, moved, divided and erased in the plane of the magnetic sheet, the magnetic sheet can be provided with digital information precessing functions by considering the presence or absence of a bubble to correspond to the digital information characters '1' or '0', respectively. In the bubble generating section NG *n* bubbles equal to the number of quantized levels of a maximum level of an input analog signal to be digitized are generated by utilizing the properties of bubbles in a magnetic sheet and $m$ ($n \geqq m$) bubbles corresponding to the instantaneous level of the input signal, are generated from the $n$ bubbles by dividing techniques. In FIG. 2A, reference character P indicates a magnetic sheet of an orthoferrite and D indicates drive lines forming drive loops disposed on the sheet P for moving the bubble. The drive loops are named after their function respectively as follows: $C_k$ is a bubble holding loop, $C_T$ is a bubble transmission loop, $C_S$ is a bubble dividing loop, $C_a$ is an input analog loop and $C_{w1}$ to $C_{wn}$ are bias control loops. Reference characters EK, ET, ES and EW designate drive power sources for supplying currents to the loops $C_k$, $C_t$, $C_s$ and $C_{w1}$ to $C_{wn}$ respectively and EA is a power source for transforming an input analog signal voltage into a current.

In FIG. 2A, the number of drive loop sections formed by the bubble holding loops $C_k$ are equal to the number $n$ of the quantized levels of a maximum level of the input analog signal to be processed. In order to generate the $n$ bubbles each at the bubble holding position in each of the $n$ drive loop sections, the magnetization of the magnetic sheet is saturated in a direction opposite to that in which a bias magnetic field is applied. A current in a direction to generate a bubble is applied to the holding loop $C_k$, which increases the bias magnetic field and forms a bubble.

Figure 2B:
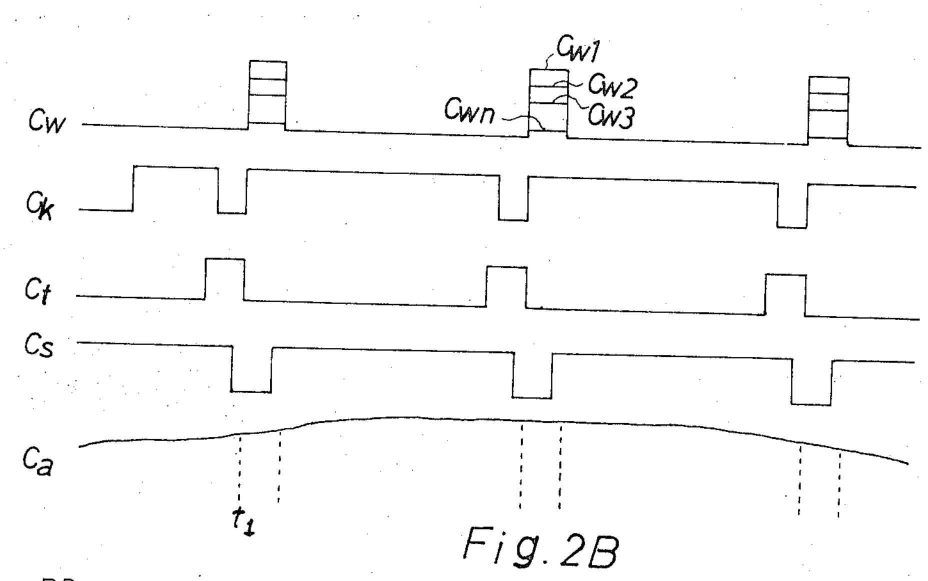
Figure 2C:
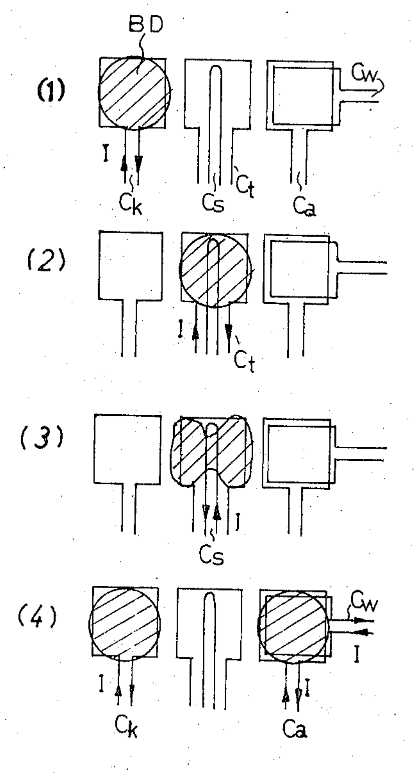

In the circuit in FIG. 2A, bubbles BD (indicated by hatched circles) present at all the holding positions in the sections of the bubble holding loops $C_k$ are moved into the sections of the bubble transmission loops $C_t$, before the input signal is sampled and are each divided into two bubbles in the sections of the loops $C_t$ By flowing a weighting current to the loops $C_{w1}$ to $C_{wn}$ at the time of sampling, bubbles of a number equal to the value of the input analog signal level are each divided into two and transferred to the input analog loops $C_a$. The $n$ bubbles in the bubble transmission loops $C_t$ are transferred back to the bubble holding loops $C_K$. FIGS. 2B and 2C are diagrams for explaining this process is more detail detail. In this circuit, a bubble is held in the holding loops $C_K$ by flowing a current through the holding loops $C_K$ in a direction to attract the bubble to the bubble holding loops $C_k$ as shown in FIG. 2C(1). Then, a current is applied to the bubble transmitting loops $C_t$ to move the bubble into a section of the loop $C_t$ as depicted in FIG. 2C(2). Next a current in a direction repelling the bubble is applied to the bubble dividing loops $C_s$ to divide the bubble at its center as shown in FIG. 2C(3) and, thereafter, currents are fed to the bubble holding loops $C_k$, the input analog loops $C_a$ and the bias control loops $C_w$ to pull apart the divided bubbles to the bubble holding loops $C_K$ and the input analog legs $C_a$ as illustrated in FIG. 2C(4). Superimposed magnetic fields established by the currents flowing in the loops $C_a$ and $C_{w1}$ to $C_{wn}$ are applied to the drive loop sections formed by the input analog loops $C_a$ and the bias control loops $C_{w1}$ to $C_{wn}$. By applying a current of a level as indicated by $C_w$ in FIG. 2B to the loops $C_{w1}$ to $C_{wn}$ in FIG. 2A to weight the magnetic field in each drive loop section, bubbles of a number equal to the input signal level can be generated by dividing the bubbles in the bubble dividing loop $C_s$. $C_w$ in FIG. 2B is shown with the values of the currents placed one on another for the purpose of showing the relationship of the magnitude of the currents applied to the loops $C_{w1}$, $C_{w2}$, .... $C_{wn}$.

A gradient is established in the bias magnetic field applied to the bubble present in the bubble transmission loop $C_t$, equal to the sum $H_a + H_w$ of the magnetic field $H_a$ established by the input analog signal current at the time current is flowing through the bubble dividing loop $C_s$ and of the magnetic field $H_w$ established by the current of the bias control loop $C_w$ The magnetic field $H_w$ changes its magnitude in a stepwise manner, so that only when the gradient of the bias magnetic field established by the sum $H_a + H_w$ of the magnetic fields exceeds a limit value for is the bubble divided into two to provide new bubbles in the sections of the loops $C_a$. For instance, in the case of representing the level of the input analog signal from zero to a maximum with levels of ten levels, the current in the loop $C_{w10}$ is determined so that the magnetic field gradient, which is established in the bubble in the loop $C_t$ by the sum of the magnetic field formed in the section of the loop $C_a$ and that in the tenth bias control loop $C_{w10}$ by a current of the maximum level of the input analog signal, is equal to the limit value for the transmission of the bubble. Then the current of the loop $C_{w1}$ is determined so that the magnetic field gradient, which is established in the bubble in the section of the loop $C_t$ by the sum of the magnetic fields established in the loop $C_a$ and that in the first bias control loop $C_{w1}$, for the case of the input analog signal being equal to the value of the level "1," may be equal to the limit value for the transmission of the bubble and, further, currents of such magnitude that current values obtained by dividing the difference between the currents of the loops $C_{w1}$ and $C_{w10}$ into nine equal values are sequentially subtracted from the current of the loop $C_{w1}$ and applied to the loops $C_{w2}$, $C_{w3}$....$C_{w9}$ respectively.

In the circuit in which the currents flowing to the bias control lines are thus adjusted, where the respective currents are applied in a time relation as depicted in FIG. 2B, and if the input analog signal is at, for instance, a level 3, magnetic fields established in the planes of three drive loops surrounded by the loops $C_{w1}$, $C_{w2}$ and $C_{w3}$ can transmit a bubble in the section of the loop $C_t$. Since a bias magnetic field gradient can be established to satisfy the condition for moving the bubble, three bubbles can be obtained in the loops $C_a$. At this time, bubbles are also present in the sections of the loops $C_t$ at positions corresponding to the loops $C_{w4}$, $C_{w5}$,.... and these bubbles are about to be severed at their center by the current applied to the loop $C_s$.

In practice, immediately before the bubbles are severed a current is applied to effect the division by the attractive force of the magnetic fields established by the loops $C_k$ and $C_a$. Accordingly, those bubble which have not been divided are assembled into one bubble again when the current flowing in the loop $C_s$ becomes zero. But the magnetic fields established in the sections of the seven drive loops surrounded by the loops $C_{w4}$, $C_{w5}$,....$C_{w10}$ cannot produce magnetic field gradients sufficient for shifting bubbles into the sections of the loop $C_t$, so that the bubbles are not shifted into the respective sections of the loop $C_a$ but return into the sections of the loop $C_k$. In this case, the repetitive time of a pulse applied to the loop $C_s$ is the time interval for the sampling.

Figure 2D:
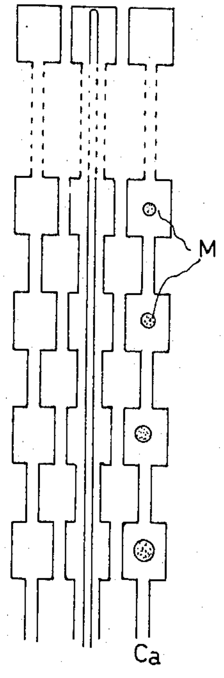

The function of the bias control loops depicted in FIG. 2A can also be obtained by other means. FIG. 2D illustrates an embodiment of the present invention in which magnetic members $m$, each capable of establishing a magnetic field in the same direction as that by the loop $C_a$, are disposed in place of the bias control loops. In this case, it is sufficient to control the magnitude of the bias magnetic field by changing the magnitude of the saturation magnetization $M_s$ or the volumes of the magnetic members M and, in the figure, this is shown by different diameters of the magnetic members M.

The foregoing description has been given mainly to describe a method of using reference levels obtained by sampling the value of an input analog signal at regular intervals for sampling and quantizing the analog signal. By quantizing the input analog signal at reference levels selected according to a desired compression characteristic the analog signal will be compressed. In this case the currents of the respective bias control loops are not set to have an equal difference in current value between adjacent ones but instead the difference between the currents applied to the bias control loops for low values of the input analog signal is small and the difference is increased for loops corresponding to higher values of the input analog signal. By increasing the differences in the current value, for example, in the manner of a logarithmic curve, a logarithmic compression characteristic can readily be realized.

Figure 2E:
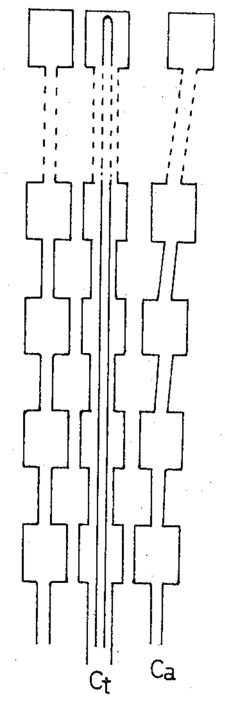

In FIG. 2E, there is illustrated an embodiment of the present invention which does not employ the bias control loop $C_w$ and the magnetic member M. In this case the distance between the loops $C_t$ and $C_a$ is sequentially changed. The magnetic fields established by the loop $C_a$ are the same but, since the distance between them and the loop $C_t$ varies, the level of the input analog signal can be converted into a number of bubbles determined by the spacing between loop $C_a$ and loop $C_t$. By arranging the loops $C_t$ and $C_a$ in such a manner that the distance therebetween increases linearly, the input analog signal will be quantized into equi-spaced levels but by arranging the loops $C_t$ and $C_a$ so that the distance therebetween may vary according to a logarithmic curve, a logarithmic compression characteristic will be realized.

FIG. 3 is a diagram showing an example of the bubble selecting section, BC in FIG. 1 and a diagram of the current waveforms associated with its operation. The bubble selecting section BC, measures the magnitude of the input analog signal level represented in the form of a number of bubbles by counting the number of bubbles.

Figures 3A, 3B, 3C, 3D:
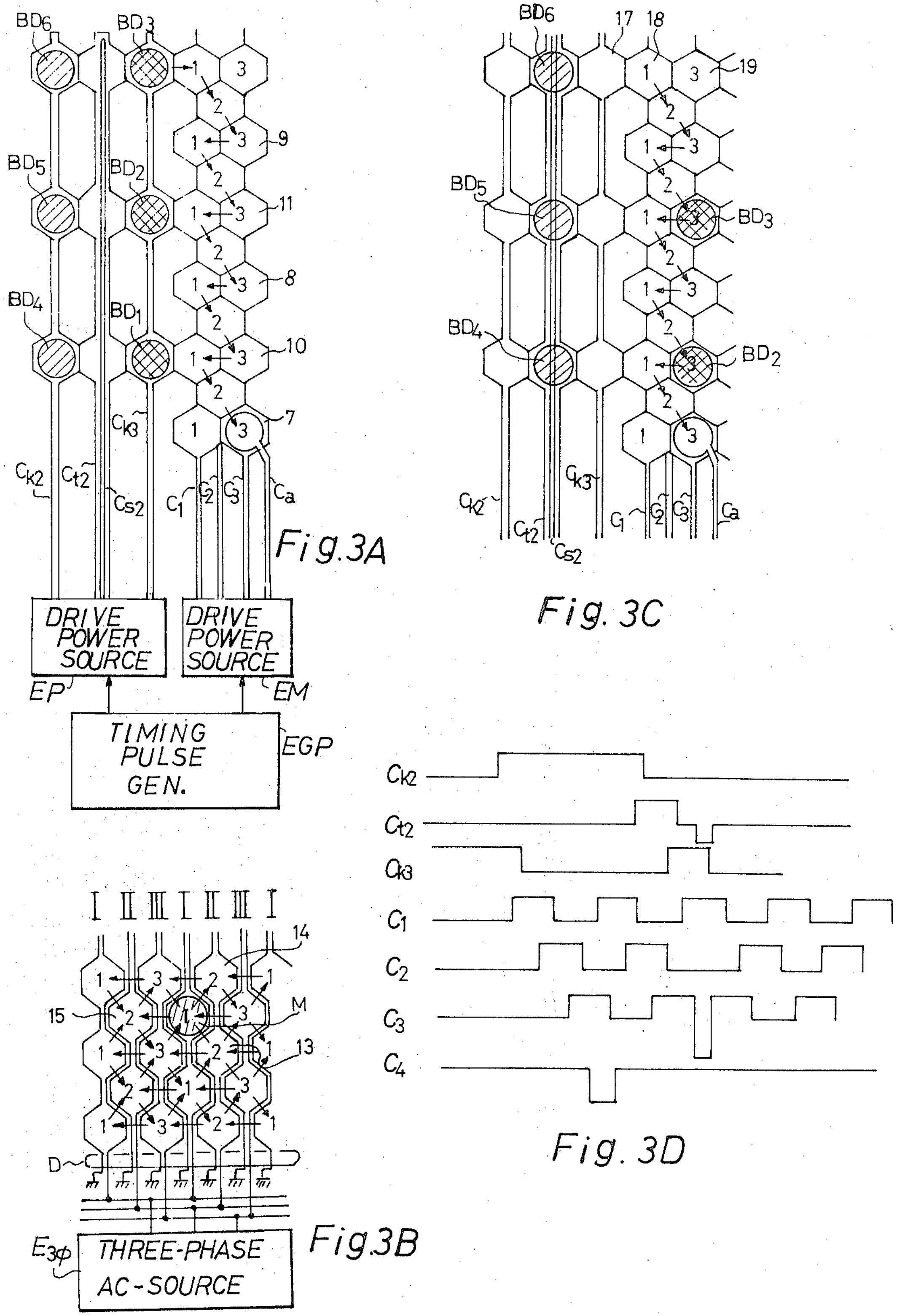

FIG. 3A shows an example in which all the bubbles 1 to *m* vertically aligned as briefly referred to in the description of FIG. 1, were obtained as a result of sampling the *n* bubbles generated in the section NG, while FIG. 3B is a diagram to aid the explanation of the operation of the one part of FIG. 3A.

In FIG. 3A, reference characters $C_{k2}$, $C_{t2}$, $C_{s2}$, and $C_{k3}$ indicate drive loops for further bisecting the bubbles generated in the bubble generating section NG; and reference characters $C_1$, $C_2$, $C_3$ and $C_a$ represent selector circuits for shifting only the bubble $BD_1$ among the bubbles $BD_1$, $BD_2$ and $BD_3$ generated in the bubble generating section NG and indicated by mesh hatching. The drive loops $C_1$, $C_2$ and $C_3$ of the selector circuits are shown schematically and their physical layouts are depicted in in FIG. 3B. In the circuits shown in FIG. 3B, the spacing of each of drive line pairs D of phases I, II and III reciprocating the drive loops for driving the bubbles is widened periodically to form drive-sections; the widened parts are formed hexagonal. These drive line pairs are arranged in a pattern of a honeycomb and currents are sequentially applied from a three-phase AC current source to the drive line pairs of the respective phases to alternately hold the bubbles in the hexagonal drive sections and to transmit them. If the bubble (indicated by hatching in the figure) 3B is considered, it has three possible transmission paths to drive sections 13, 14 and 15 as indicated by arrows but the bubble can be moved only to the drive section 13 by disposing a magnetic member M (indicated by a black circle) to specify the transmission path at the boundary of the considered drive section and the section 13.

In the selector circuit shown in FIG. 3A, no indication has been given of a magnetic member for specifying the transmission path, as explained above in connection with FIG. 3B. This manner of illustration will be employed in the following figures and when illustrating bubble transmission paths.

A description of the operation of the selector circuit in FIG. 3A follows. In the selector circuit, the respective bubbles are shifted by a first driving loop as indicated by solid line arrows, that is, the bubbles $BD_1$, $BD_2$ and $BD_3$ are brought shifted to the sections 7, 8 and 9 of the drive loops respectively. At this time a current in a direction to erase bubbles is applied to the loop $C_a$ to erase only the bubble $BD_1$. Then the bubbles $BD_2$ and $BD_3$ are shifted in the directions indicated by the solid line arrows. The bubbles $BD_2$ is shifted from section 8 of the drive loop to section 10 and bubble $BD_3$ is similarly shifted from the section 9 to section 11 as depicted in FIG. 3C. At this time, counterparts of the divided bubbles, that is, $BD_4$, $BD_5$ and $BD_6$ indicated by oblique lines are shifted to the drive loop sections of the loop $C_{t2}$ as shown in FIG. 3C. Then, if a current is applied to the loop $C_{k3}$, the bubbles $BD_4$, $BD_5$ and $BD_6$ will normally shift to the section of the loop $C_{k3}$. However, since the bubbles $BD_4$ and $BD_5$ are subjected to a repelling force from the bubbles $BD_2$ and $BD_3$, they cannot shift to the loop $C_{k3}$ and remain in the section of the loop $C_{t2}$. Since, since only the bubble $BD_6$ is not subject to any repelling force, it shifted to section 17 of the loop $C_{k3}$. At this time, a current in a direction to erase bubbles is applied to the loops $C_{t2}$ and $C_3$, thereby erasing the bubbles $BD_2$, $BD_3$, $BD_4$ and $BD_5$. Then in order to transmit the bubble $BD_6$ located in the section 17 to the subsequent encoding section CD, the phase sequence of the current fed to the loops $C_1$, $C_2$ and $C_3$ is reversed to transmit the bubble $BD_6$ to the drive loop section 18 and then to the section 19, thus applying it as an input to the encoding section CD.

The currents necessary for these operations are supplied from drive power sources EP and EM which are controlled by a timing pulse generator EPG, as depicted in FIG. 3A. The phase relationships of the currents fed to the respective drive loops which are necessary for these operations are shown in FIG. 3D.

Figures 4A, 4B, 5:
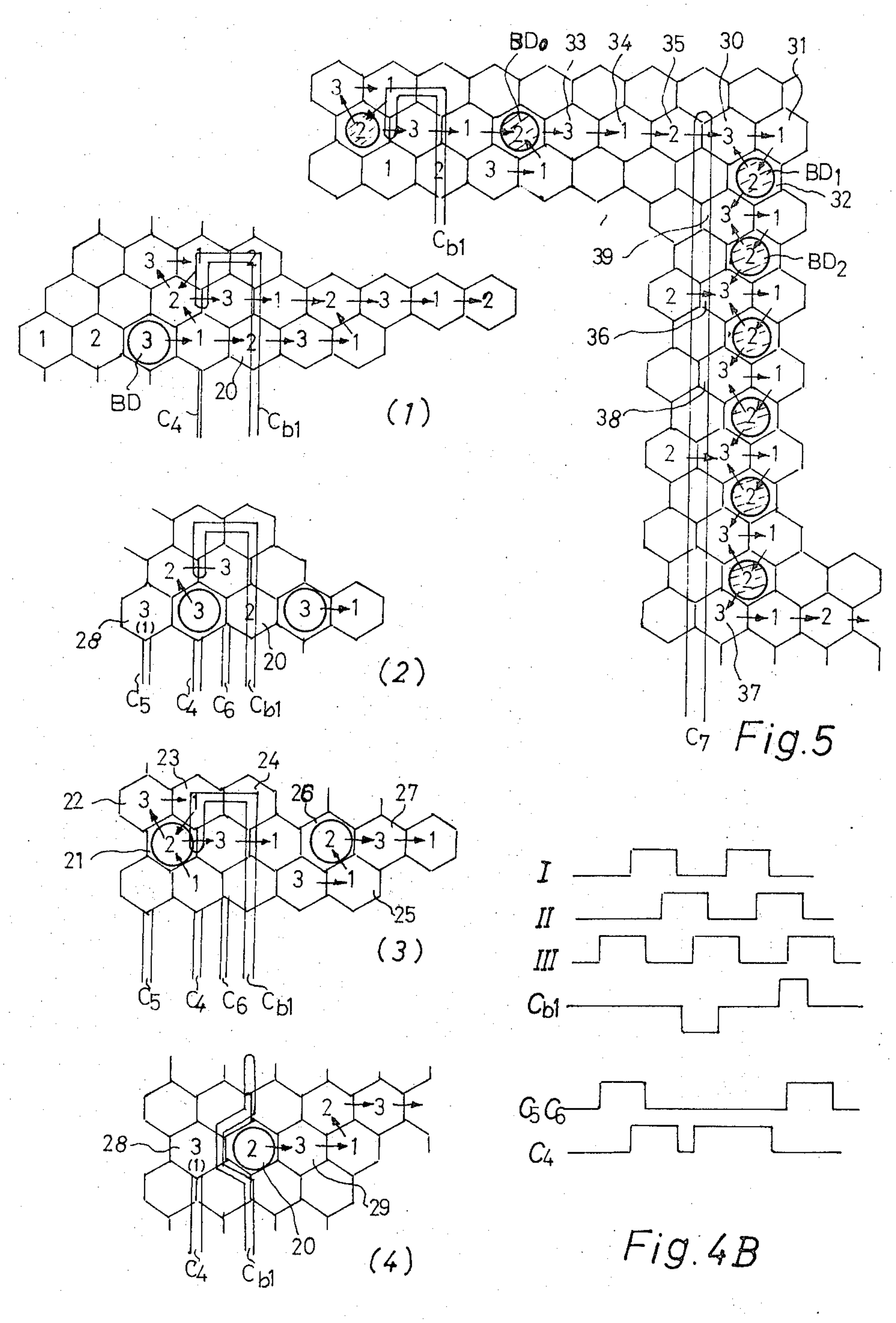

FIG. 4A shows diagrams illustrating the encoding section CD of the present invention. In FIGS. 4A (1), 4A (2) and 4A (3), there is depicted an encoder for encoding a signal from the decimal number "3" into a binary signal ("11"). In the encoder, a bubble BD is transferred to the input position of the encoder shown in FIG. 4A (1) The bubble is transmitted to a drive loop section 20 and then divided by a bubble dividing loop $C_{b1}$ which also serves as a code reading-out loop into two bubbles as depicted in FIG. 4A (2). One of the two divided bubbles is transmitted to sections 21, 22 and then to section 23 in the drive loop section as shown in FIG. 4A (3) Simultaneously with the flow of the third-phase current, a read-out current is fed to the loop $C_{b1}$ to shift the bubble to a holding position 24 in the drive loop sections thus providing a signal representative of, the $2^0$ digit. The other of the divided bubbles is transmitted to sections 25, 26 and 27 in drive loop sections to provide a signal bubble representative of the $2^1$ digit as depicted in FIG. 4A (3). The binary signal 11 stored in the holding positions 27 and 24 in the drive loop sections are transmitted to the right and applied to the bubble high speed transmission section HP to produce an output digital signal. FIG. 4B, illustrates waveforms of the currents in the respective drive loops for encoding by the method described above. In FIG. 4A (2), the numerals 1 and 3 in the drive loop section 28 indicate that although this drive section 28 is usually supplied with a first phase current, a third-phase current must be applied to the drive section 28 for shifting one of the divided bubbles back to the drive section 28 during the generation of the bubble corresponding to the $2^0$ digit. Accordingly, the drive section 28 is supplied with a current such as indicated by the waveform $C_4$ in FIG. 4B formed by the partial addition of the first-and third-phase currents.

FIG. 4A (4) illustrates an encoder CD for encoding a decimal number "2" into a binary number "10". In this case, the signal of $2^0$ digit is zero, so that a bubble should not be divided in the drive section 20. However, as described above in connection with FIG. 4A (2), when a bubble is present at the holding position in the drive section 20, the loop $C_{b1}$ is supplied with a current in a direction to divide the bubble, and the drive sections 28 and 29 are both supplied with the third-phase driving current to attract the bubbles thus generated. In order that the bubble may be shifted to the holding position in the drive section 29 without being divided, the loop $C_{b1}$ is shaped as shown in FIG. 4A (4). If the loop $C_{b1}$ is arranged as illustrated in the figure, the bubble is shifted only to the holding position in the drive section 29 because a current in a direction to repel the bubble will be applied to the loop $C_{b1}$.

In the encoder CD employed in this invention, digits corresponding to "1" of the binary information digit are sequentially produced by a bubble entering from the input of the encoder. Production of the being digits begins, in this example, with less significant digits but it may also start with the most significant digits.

Further, the encoder for use in this invention is capable of producing various codes by disposing the bubble dividing section at an appropriate section in a drive loop.

FIG. 5 is a diagram to explain the bubble high speed transmitting section HP used in this invention. In the bubble high speed transmitting section HP, a circuit which is adapted so that one bubble is shifted among respective holding positions of three drive sections indicated by, for example, 30, 31 and 32, is used as a unit circuit and a plurality of such unit circuits are arranged adjacent to one another. In the steady state, a bubble continues to shift within a unit circuit, for example, from drive sections 31 to 32 and 30 and then back to the section 31. Consider, a bubble $BD_0$ transmitted to drive sections 33, 34 and then to section 35 when the drive current is switched from the second to the third phase, a current is applied to the drive loop $C_1$ to transmit the bubble $BD_0$ to the unit circuit. The bubble $BD_1$ circulating in the unit circuit is repelle by the bubble $BD_0$ which is in the drive section 35 in a neighboring unit circuit. At this time, a bubble $BD_2$ circulating in the unit circuit, in which the bubble $BD_1$ has entered, cannot move to the holding position of the drive section 35, so that it shifts from the unit circuit into a drive section 36. Since similar operations simultaneously take place in all of the unit circuits making up the high speed bubble transmitting section HP, one bubble is received in the drive section 30 which serves as an output position simultaneasly with entry of the bubble $BD_0$ into the drive section 30. The operations of the high speed bubble transmitting section HP described above are independent of the number of the unit circuits, and the input position to the circuit is not limited to one. Even when a bubble enters from any of the drive sections, for example, 35, 36, 38 and so on, the high speed bubble transmitting section HP can be driven, so that if encoders are distributed in a section, as is the case with the encoder employed in the present invention, an output digital signal can always be derived from the same position.

Figure 6:
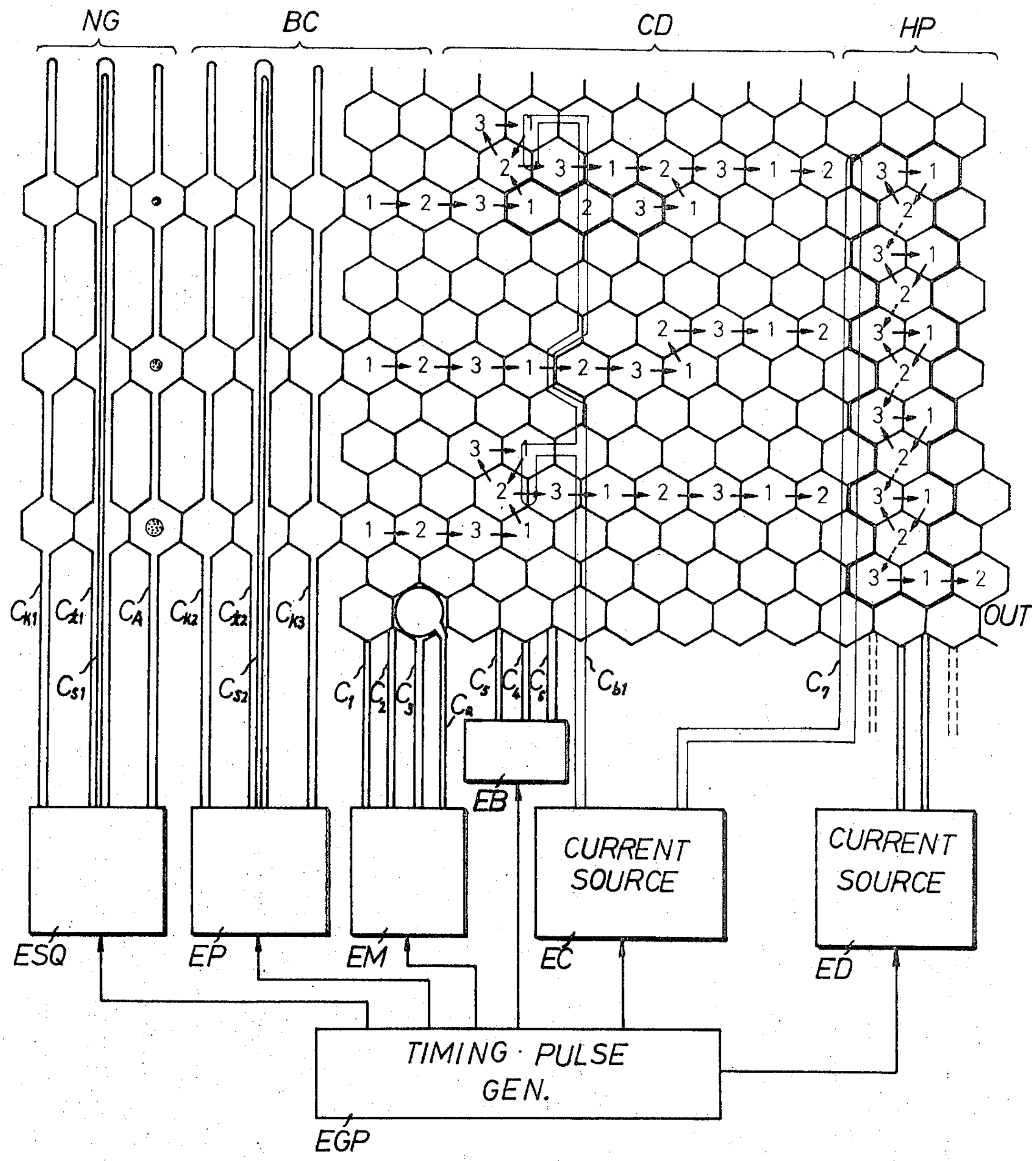
FIG. 6 is a diagram illustrating an concrete example of this invention.

FIG. 6 shows an assembly of the bubble generating section NG, the bubble selecting section BC the encoding section CD and the high speed bubble transmitting section HP described in the foregoing in connection with FIGS. 2A, 2B, 2C, 2D, 3A, 3B, 3C, 3D, 4A, 4B and 5. The figure illustrates an A-D converter for converting three levels of an input analog signal into an output digital signel of two bits. In FIG. 6, the four current sources $E_K$, $E_T$, $E_S$ and $E_A$ depicted in FIG. 2A are shown as a single unit ESQ, the current sources for exciting the drive loops making up the encoding section CD. The high speed bubble transmitting section HP current source is shown in the form of one block ED and the lines connecting the drive loops to the block ED are partially omitted. The current sources for exciting the loops $C_4$, $C_5$ and $C_6$ described previously in connection with FIG. 4A are similarly shown in the form of one block EB, and all power sources are controlled by the timing pulse generator EGP.

As has been described in detail in the foregoing that in the A-D conversion system of this invention, the level of an input analog signal is quantized by converting it into a representative number of bubbles so that rapid and highly accurate quantization can be performed, and a desired compresssion characteristic can be obtained with a simple circuit configuration. Moreover, since the encoders are arranged in a plane, rapid and accurate encoding can be achieved and outputs derived from any encoders can be collected simultaneously at a desired position on the magnetic sheet to facilitate using the output of the A-D converter as an input to another circuit. It is also possible to divide and construct the entire circuit on several magnetic sheets so that this system offers great freedom in.

In another type converter according to the present invention, the aforementioned magnetic sheet producing the bubble therein is used as a memory medium. An analog signal is sampled at regular intervals and bubbles of a number equal to the level of the sampled analog signal are generated and converted into a digital signal, and, if necessary, stored in the magnetic sheet.

Figure 7:
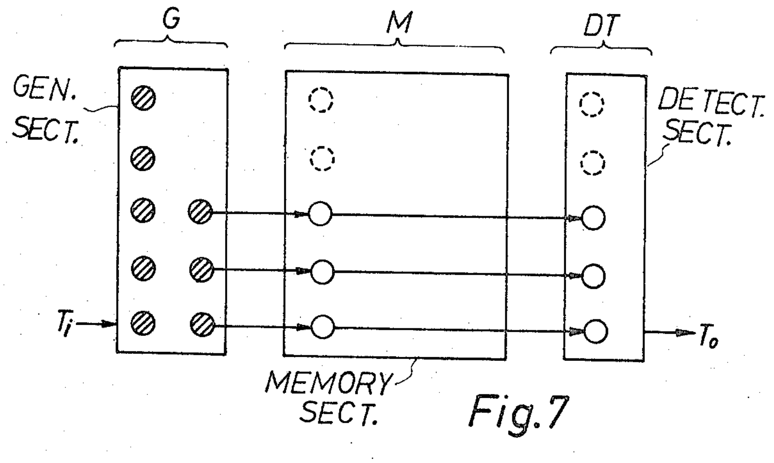
FIG. 7 is a diagram for explaining the construction and the principle of another typed system of this invention.

FIG. 7 is a diagram illustrating the device used for information storage according to this invention, which comprises a bubble generating and converting section G, a bubble storage section M, and a bubble detecting section DT. The function of each of the sections is described below.

1. The bubble generating and converting section G is a section in which the level of an input analog signal is sampled at regular intervals and the sampled analog signal levels are quantized and in which bubbles equal in number to the sampled levels are generated at each sampling time. The bubble generating technique uses a method in which n the bubbles equal in number to the number of quantized levels corresponding to the maximum level of an input analog signal being converted are prepared in advance in $m$ bubbles ($n \geqq m$) corresponding to an instantaneous level of the input signal are generated from the $n$ bubbles by a dividing technique.

2. The bubble storage section M is a section in which the bubbles generated in the section G are stored for a desired period of time.

3. The bubble detecting section DT is a section in which the bubbles stored in the section M are detected to provide a voltage proportional to the level of the sampled input analog signal.

A detailed description of these three sections follows. The bubble generating and converting section G is substantially the same as the sections NG, BC and CD shown in FIG. 1.

FIG. 8 illustrates one embodiment of the bubble storage, section M and the bubble detecting section DT whose operations were described previously in connection with FIG. 7.

Figure 8A:
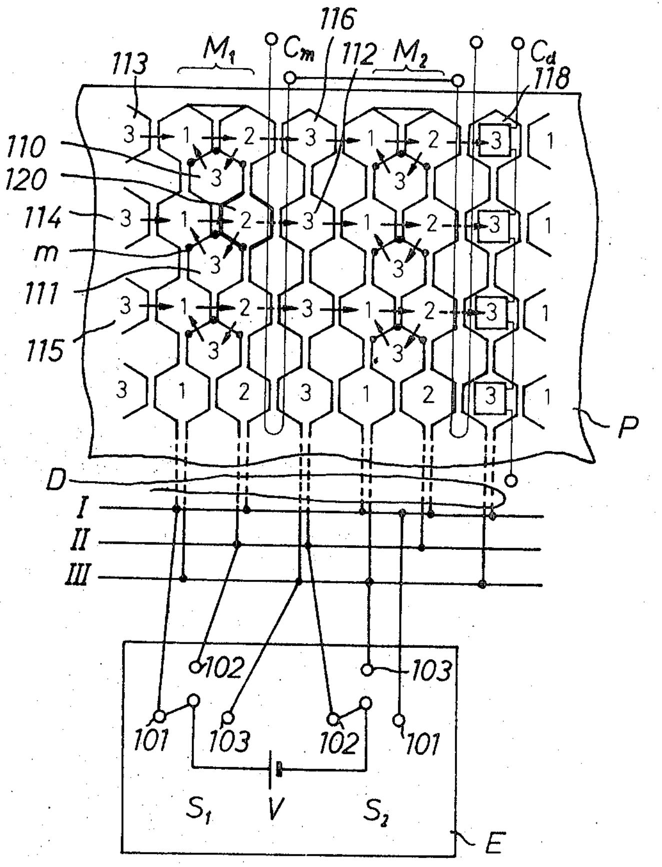
FIG. 8A is diagram for explaining one concrete example of an element section for the example shown in FIG. 7.

Referring to FIG. 8A, a description will be first given of the drive loop for transmitting a bubble. The figure illustrates a magnetic sheet P, on which drive lines D for shifting and transmitting the bubble are arranged. Adjacent drive lines make are paired and arranged to form hexagonal drive sections at regular intervals these hexagonal drive sections formed by the drive lines are arranged in a honeycomb pattern. All the drive lines D making up the drive sections are sequentially connected at one end to power source lines corresponding to the respective phases, for example, in an order of III, II and I, of a three-phase power source. In order to apply drive currents to these drive lines I, II and III to hold bubbles in the hexagonal drive sections and transmit them, switches $S_1$ and $S_2$ are connected to a DC voltage source V to selectively apply a voltage to a pair of the power source lines I, II, III, to energize particular drive sections. For instance, when switch $S_1$ is set to terminal 101 and switch $S_2$ is set to terminal 102 the hexagonal drive sections indicated by a numeral 2 are all energized to hold bubble therein. Then, when the power source lines of the phases II and III are selected by connecting the switches $S_1$ and $S_2$ to terminals 102 and 103 respectively, the hexagonal drive loops indicated by a numeral 3 are all energized. Similarly, when the power source lines of the phases III and I are selected by setting the switches $S_1$ and $S_2$ to the terminal 103 and 101 respectively, the hexagonal drive loops indicated by a numeral 1 are all excited.

Thus, currents are periodically and sequentially applied to the conducting thin film drive lines connected to the power source lines of the respective phases by sequentially selecting the power source lines in such an order as I and II, II and III, I and III,... by means of a gate circuit to excite the hexagonal drive sections in a sequential order. As a result of the above excitation, bubbles are shifted from certain hexagonal drive section into drive sections adjacent thereto and transmitted in an order corresponding to the excitation sequence of the drive loops. For instance, a hexagonal section 120 indicated by heavy lines in FIG. 8A has three transmissible paths, because drive section 110 and 111 adjacent to the section 120 on its left and 112 on its right are simultaneously excited. Consequently, means for specifying a transmission path is required. This is achieved by using magnetic spots M or shift coils $C_m$. Further, some drive sections (not indicated by any numerals in FIG. 8A) are not excited by appropriately selecting short circuiting lines on the side opposite from the power input ends of the drive lines D, so that the bubble transmitting direction can be specified by the abovementioned method.

The circuit illustrated in FIG. 8A is a memory circuit which is capable of storing two sampled valves of a analog input signal having three bubbles correspond to its maximum value. In the case where bubbles enter from the hexagonal drive section 113, 114 and 115, the bubbles move as indicated the solid line arrows and each bubble circulate a in one of three drive sections forming a first bubble storaging part $M_1$ indicated by the loops of arrows 1 → 2 → 3 → 1. If no current is applied to the shift coil $C_m$ the bubbles continue to circulate in the bubble storing part $M_1$ indefinitely. However, if a current flows through the shift coil $C_m$ at the time the excitation shifts from the second phase to the third one, the bubbles stop the circulating and shift to drive sections 116, 112 and 117 and thereafter are transmitted, as indicated by solid line arrows, to circulating-and-moving circuits making up a second bubble storing part $M_2$. At this time, bubbles corresponding to other sampled values of the input signal have also entered the first bubble storage part $M_1$ through the drive sections 113, 114 and 115 respectively. This condition remains unchanged unless a current is applied to the shift coil $C_m$, so that a sampled value of the analog signal is indefinitely stored in the form of bubbles in the magnetic sheet P.

In FIG. 8A, reference numeral 118 designates bubble detectors such as Hall elements, which are all interconnected in series so that individual detected voltages will be added together.

To read out the stored contents of the memory section M, a current is fed to the shift coils $C_m$ to shift the bubbles to the drive section where the bubble detectors 118 are located, thereby developing in a detecting line $C_d$ a voltage proportional to the sampled value of the analog signal.

Figure 8B:
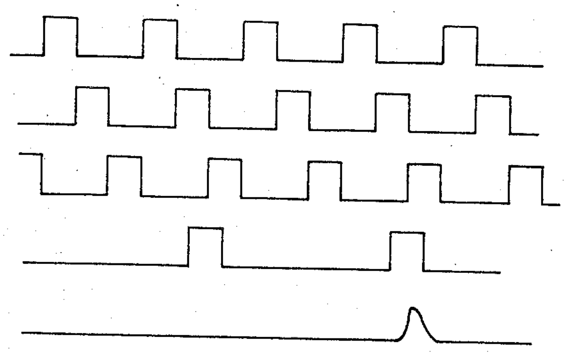
FIGS. 8B and 8C are waveform diagrams for explaining the operation of the example shown in FIG. 8A.

FIG. 8B shows the current waveforms in the drive lines in the circuit of FIG. 8A necessary for storing the bubbles in the bubble storing parts $M_1$ and $M_2$ for a period of time corresponding to two cycles of a three-phase drive cycle and for reading out the memory, and a voltage wave form detected in the bubble detecting line $C_d$.

Figure 8C:
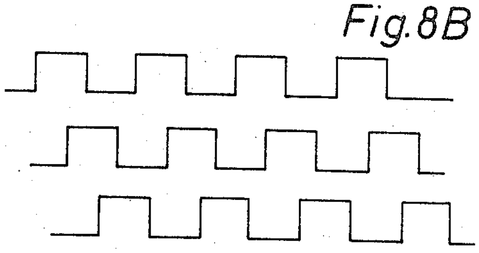

While the foregoing description was made for the case where the bubble storage section is constructed with the honey comb-shaped bubble drive loops depicted in FIG. 8A, the bubble storage section can also be constructed with honeycomb-shaped drive lines having independent drive loops for each phase as shown in FIG. 3B. FIG. 8C shows the current wave forms which are applied to the honey comb-shaped drive lines.

Figure 9:
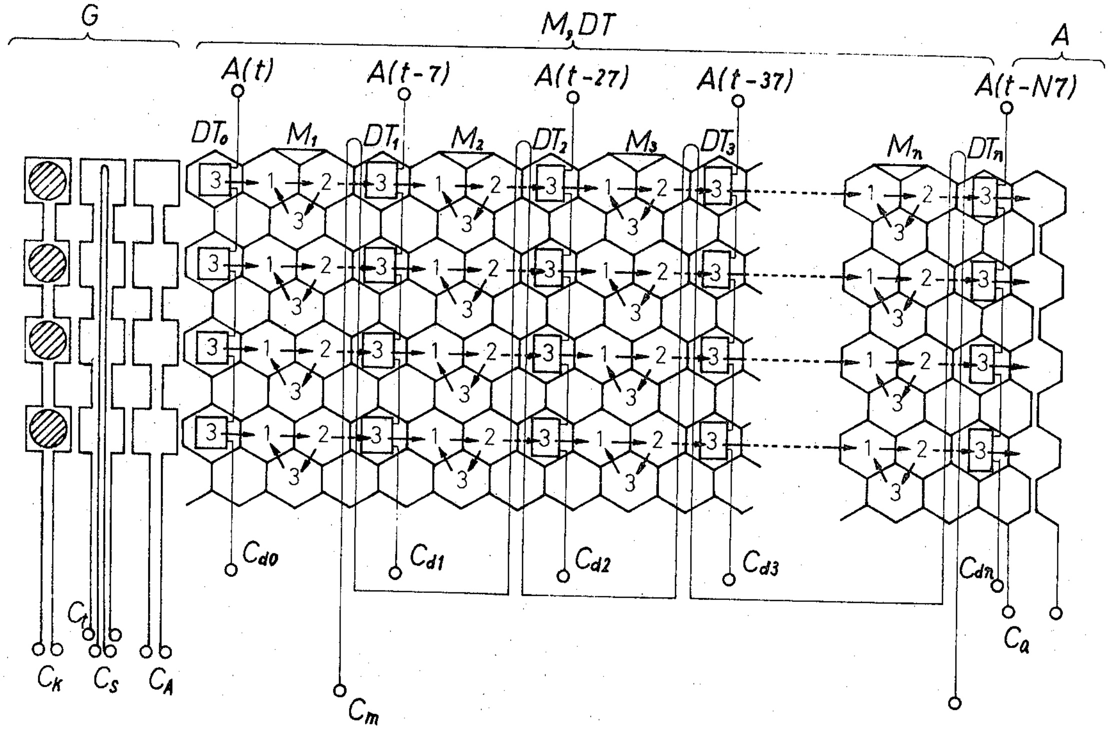
FIG. 9 is a diagram illustrating another example of this invention.

FIG. 9 illustrates another embodiment of this invention, which is a delay circuit in which sampled values of an analog signal can be obtained while being sequentially delayed by a time corresponding to an integral multiple of a unit delay time $t$. In this circuit, the bubble storage sections M and the detecting sections DT described in connection with FIGS. 8A, 8B and 8C are arranged alternately and regularly after the bubble generating and converting section G, and a bubble erasing section A is disposed after the bubble storing sections and the detecting sections. In FIG. 9 bubble transmitting circuits of the bubble storage sections M and the detecting sections DT are illustrated by a schematic representation and are identical with those described in connection with FIG. 8A. Adjacent drive lines are indicated by one line and the transmitting path specifying means are also omitted and the paths capable of transmitting the bubbles are indicated by arrows. The operation of the delay circuit shown in FIG. 9 will be described. First $m$ bubbles which are generated by the bubble generating-and-converting section G to correspond to the analog signal level are transferred through a bubble detecting part $DT_0$ to the bubble storing part $M_1$ by the third-phase excitation. Consequently, a voltage $A_1$ ($t$) corresponding to the analog signal level is derived in a detecting line $C_{do}$. The bubbles in the storing part $M_1$ circulate and move in the circulating circuit for a required period of time so as to have a desired delay time $t$ and then the bubbles are shifted to a detecting part $DT_1$ to a storing part M 2 by a shift current applied to the shift coil $C_m$ at the time the excitation changes from the second phase to the third. Consequently, the voltage $A_1$ is obtained again in the detecting line $C_{d1}$ but delayed by the time $t$. The bubbles in the storing part $M_2$ circulate in the circulating circuits for the time $t$ and then are shifted to a storing part $M_3$ through a detecting part $DT_2$ by a current applied to the shift coil $C_m$. As a result the voltage $A_1$, delayed by a time $2t$, is obtained again in a detecting line $C_{d2}$. In a similar manner, the voltages $A_1$, delayed by $3t$, $4t$....$Nt$ are obtained in detecting lines $C_{d3}$, $C_{d4}$, $C_{dn}$ respectively. The bubbles having passed through the detecting part $DT_n$ enter a bubble erasing line $C_a$, in which they are all erased.

It will be apparent that a shift register type memory circuit can be realized by designing the above circuit so that the bubbles in the storage section are sequentially transmitted without causing them to circulate.

As has been described in detail in the foregoing, another embodiment of this invention performs a memory function by converting the level of an analog signal into an equal number of bubbles, stores them in a magnetic sheet for as long as desired, and reads out the level of the signal nondestructively after a desired delay time. This embodiment of the invention can be used as a signal memory circuit, a signal delay circuit, a pulse amplitude modulating circuit and a pulse-position modulating circuit, and hence is of great utility and commercial value.

What we claim is:

1. An A-D conversion system for an input analog signal using magnetic bubbles produced in a magnetic sheet, comprising the following means disposed in close contact with one surface of the magnetic sheet:

first generating means for generating the magnetic bubbles of a number equal to the number of quantization levels which are determined to correspond to a maximum level of the input analog signal;

second generating means coupled to the first generating means for dividing the magnetic bubbles corresponding in number to an instantaneous level of the input signal from the magnetic bubbles equal in number to the quantization levels and for generating the divided magnetic bubbles;

bubble selecting means coupled to the second generating means for picking up only one magnetic bubble corresponding to the highest level from the magnetic bubbles generated by the second generating means in response to the input signal;

code means coupled to the bubble selecting means for generating magnetic bubbles which make up a digital code corresponding to the position of the one magnetic bubble picked up by the bubble selecting means; and high speed bubble transmitting means coupled to the code means for picking up at an output position at least one magnetic bubble which makes up the digital code.

2. An A-D conversion system for an input analogue signal using magnetic bubbles, comprising:

a magnetic sheet;

bubble generating means comprising drive sections disposed in close contact with the magnetic sheet so as to be equal in number to the quantization levels for a maximum level of the input analog signal for generating in the magnetic sheet a plurality of magnetic bubbles corresponding to the drive sections respectively; and bubble dividing means comprising a plurality of input drive sections disposed in close contact with the magnetic sheet and coupled with the drive sections of the bubble generating means respectively and weighted in order for dividing magnetic bubbles of a number corresponding to an instantaneous level of the input analog signal from the magnetic bubbles held in the drive sections of the bubble generating means and for holding the divided bubbles when the input analogue signal is applied to the input drive sections, an instantaneous value of the input analog signal being caused to correspond to the number of the magnetic bubbles held by the bubble dividing means.

3. An A-D conversion system according to claim 2, further comprising a drive source coupled to the dividing means to cause the dividing means to achieve the division every constant period; memory means having a plurality of drive sections arranged in close contact with the magnetic sheet in such a manner as to be coupled to the input drive sections of the dividing means respectively and for sequentially receiving the magnetic bubbles divided by the dividing means every constant period to temporarily store the received magnetic bubbles; shift means having a plurality of drive section groups each comprising a plurality of drive sections for parallel shifting, the magnetic bubbles temporarily stored in the memory means, in the magnetic sheet in synchronism with the constant period; and detecting means arranged in close contact with the magnetic sheet in such a manner as to be coupled to the drive sections of each stage of the shift means and so connected as to obtain the sum of detected signals obtained by detecting the magnetic bubbles held in the corresponding drive sections; and in which a digitalized output of the input analogue signal is taken out through the detecting means at the constant period.

* * * * *